United States Patent
Jebenstreit et al.

(10) Patent No.: US 10,333,388 B2
(45) Date of Patent: Jun. 25, 2019

(54) CONTROL DEVICE AND CONTROL METHOD FOR LARGE POWER CONVERSION

(71) Applicant: GE Energy Power Conversion Tech Ltd., Rugby, Warwickshire (GB)

(72) Inventors: Helmut Jebenstreit, Berlin (DE); Frank Wothe, Berlin (DE); Kai Niemann, Berlin (DE)

(73) Assignee: GE ENERGY POWER CONVERSION TECHNOLOGY LTD, Warwickshire (GB)

( * ) Notice: Subject to any disclaimer, the term of this patent is extended or adjusted under 35 U.S.C. 154(b) by 0 days.

(21) Appl. No.: 15/762,850

(22) PCT Filed: Sep. 30, 2016

(86) PCT No.: PCT/EP2016/073512
§ 371 (c)(1),
(2) Date: Mar. 23, 2018

(87) PCT Pub. No.: WO2017/055605
PCT Pub. Date: Apr. 6, 2017

(65) Prior Publication Data
US 2018/0358887 A1 Dec. 13, 2018

(30) Foreign Application Priority Data
Oct. 2, 2015 (EP) .................................. 15188214

(51) Int. Cl.
*H02M 1/32* (2007.01)
*H02M 7/483* (2007.01)
(Continued)

(52) U.S. Cl.
CPC ............ *H02M 1/32* (2013.01); *H02M 1/088* (2013.01); *H02M 7/219* (2013.01); *H02M 7/483* (2013.01);
(Continued)

(58) Field of Classification Search
CPC ................... H02M 1/088; H02M 1/32; H02M 2007/4835; H02M 7/219; H02M 7/483; H02M 7/5387
See application file for complete search history.

(56) References Cited

U.S. PATENT DOCUMENTS 9,460,035 B2   10/2016  Opitz et al.
2010/0005328 A1* 1/2010  Rakshani ............ G06F 1/3203
                                                          713/322
(Continued)

FOREIGN PATENT DOCUMENTS

DE   10 2013 207 826 B3   7/2014
EP          2 905 884 A1   8/2015

OTHER PUBLICATIONS

Huang, S., et al.,"Analysis of Communication Based Distributed Control of MMC for HVDC," 15th European conference on Power Electronics and Applications (EPE), pp. 1-10 (Sep. 2013).

(Continued)

*Primary Examiner* — Fred E Finch, III
*Assistant Examiner* — Demetries A Gibson
(74) *Attorney, Agent, or Firm* — Wood IP LLC

(57) ABSTRACT

A control device and method for large power converters having a high number of power cells may contain power semiconductor switching elements, receive commands from a central control unit, and send information to the central control unit. The control device comprises multiplexer/demultiplexer device(s), which comprises an uplink port for connection to the central control unit, a plurality of downlink (Continued)

ports for direct connection to a communications interface of an associated power cell, and a communications control and management module. The communications control and management module may extract information from a transmit frame received from the central control unit via the uplink port, may feed this information to the corresponding downlink port for the relevant power cell, may insert response information received from particular power cells into a receive frame, and may send this via the uplink port to the central control unit.

20 Claims, 6 Drawing Sheets

(51) Int. Cl.
    *H02M 1/088* (2006.01)
    *H02M 7/219* (2006.01)
    *H02M 7/5387* (2007.01)
(52) U.S. Cl.
    CPC .. *H02M 7/5387* (2013.01); *H02M 2007/4835* (2013.01)

(56) References Cited

U.S. PATENT DOCUMENTS

| | | | |
|---|---|---|---|
| 2012/0068555 A1* | 3/2012 | Aiello | H02M 7/483 |
| | | | 307/115 |
| 2015/0204730 A1 | 7/2015 | Daitoku et al. | |
| 2017/0025866 A1* | 1/2017 | Goetz | H02M 1/32 |

OTHER PUBLICATIONS

Extended European Search Report and Opinion issued in connection with corresponding EP Application No. 15188214.9 dated May 19, 2016.

International Search Report and Written Opinion issued in connection with corresponding PCT Application No. PCT/EP2016/073512 dated Dec. 1, 2016.

International Preliminary Report on Patentability issued in connection with corresponding PCT Application No. PCT/EP2016/073512 dated Apr. 3, 2018.

* cited by examiner

CONTROL DEVICE AND CONTROL METHOD FOR LARGE POWER CONVERSION

FIELD OF INVENTION

The present invention relates generally to a control device and a control method for controlling very large power converters or other large power-electronics units or installations having a number of power cells which receive commands from a central control unit and send information to the central control unit.

BACKGROUND

Power converters are used to convert direct current into alternating current and vice versa for many applications, for example for the coupling of electrical networks to speed-variable drives, for energy exchange between two electrical networks, for high-voltage direct current (HVDC) transmission, and the like. For this purpose, power converters are known in different circuit topologies and configurations. With progressive development of power semiconductor switches, newer converter topologies are constantly being sought and developed for increasingly higher power and voltage ranges. In the medium- and high-voltage ranges, what are known as multi-point power converters are being used increasingly in order to generate a number of voltage stages and in order to increase the voltages to higher levels reaching as far as HVDC transmission ranges.

A relatively new type of power converter topology is constituted by the modular multi-point power converter. This power converter has phase modules which consist of two branches connected in series with one another, wherein each branch is constructed from a number of identical power cells or sub-modules. Each power cell is formed by a bridge circuit, for example a full-bridge or H-bridge circuit having controllable power semiconductor switches and an internal capacitor for the temporary storage of electrical energy. Due to the modular structure, the power converter can be scaled individually for different powers and applications. One power converter branch can comprise up to or more than 300 power cells for example, which are connected in series with one another within a branch. In the case of a three-phase configuration of the power converter with six branches, 1800 cells or more can thus be provided.

A control device for power converters known from practice is illustrated in FIG. 1. A central control unit (CPU) 2 is connected to a plurality of power cells 3 for communication therewith, said cells being connected herein in series with one another. Each power cell 3 has a power semiconductor switch or a circuit, such as the above-mentioned H-bridge circuit, which is illustrated herein merely by a block 4.

The power cell 3 also contains what is known as a remote input/output (I/O) device 6, which forms the input and output device of the power cell. The remote I/O device 6 sends switching commands for the actuators or power semiconductor switches of the power cell and receives responses from sensors (not illustrated in greater detail herein) of the power cell 3, which sensors for example detect currents, voltages, temperature and other parameters in the power cells 3.

The remote I/O device 6 is connected to the control system via a communications module 7 of the remote I/O device 6, which, as illustrated in FIG. 1, has two communications connection ports 8A, 8B. In preferred implementations, the communications connections are provided with use of 100 megabit or gigabit Ethernet on the basis of fibre optic cables or copper cables.

In the currently known and used implementations of communications systems of this type, the remote I/O devices 6 are connected to one another in the line topology visible from FIG. 1. Herein, the central control unit CPU 2 is connected to a first communications port 8A of a remote I/O device 6 of a first power cell 3A. The power cell 3A is connected via its second communications port 8B to the first port 8A of the remote I/O device 6 of the second power cell 3B for communication therewith. The second power cell 3B is connected via its second communications port 8B to the remote I/O device 6 of a third power cell 3C, etc. Apart from the CPU and the remote I/O devices, no further devices are necessary herein for the communication. This is economical and simple for smaller systems and has proven in many systems to be reliable and to function well during use.

A line topology of this type of an industrial bus system comprising a master node, for example a CPU, and a plurality of slave nodes for operating high-power semiconductor switches, wherein the slave nodes are connected in series with one another via data cables, is known by way of example from DE 20 2013 207 826 B3. Here, the master node is arranged at an end of the series of slave nodes. An output data frame is sent in the output direction starting from the master node to the last slave node furthest away from the master node and passes through all slave nodes connected therebetween, whereas an input data frame, as response to the output data frame, is transmitted starting from the last slave node in the input direction towards the master node via all slave nodes disposed therebetween, which can add information to the input data frame.

There are various methods for communication in control systems of this type, as illustrated in FIG. 1. Generally, one transmit frame (Tx) and one receive frame (Rx) are transmitted per cycle for the transmission of real-time input and output data. Other methods are also possible which for example combine the transmission information and receiving information in a single frame or divide the information over more than a single transmit or receive frame. Regardless of the communications procedure, various addressing modes can be necessary and available in systems of this type. The addressing modes can be linked with various operating states of the system. For a higher number of remote I/O devices, however, it is preferred for no addressing information to be transmitted in the real-time communications frame. By way of example, in the case of 300 power cells 3 or remote I/O devices 6, as illustrated in FIG. 1, and two bytes per address information item, the entire address information would require a total of 600 bytes.

In a known communications method the addressing information in the transmit and receive frames is therefore dispensed with. Each unit knows at which point in the transmit frame it is to extract the information relevant for said unit (T-RIOn) and at which point in the receive frame it should insert response information (R-RIOn). This function, which is also referred to as communications control and management or CCM for short (Communication Control Manager), is integrated in the communications module 7 of the remote I/O device 6, as indicated in FIG. 1 by reference sign 9.

For large power converters, as mentioned in the introduction, the control power and operational capability are very important. For example, a control cycle time of 100 microseconds is assumed for the control power and includes the transmission of the transmit frame, the control process, the transmission of the receive frame, and a short break between two cycles. With a communications delay time of just 0.3 microseconds per remote I/O device and with 300 remote I/O devices, each transmit and receive frame would experience a total delay time of 90 microseconds. It is clear that with such a delay the control performance requirements in the case of a large power converter with use of a logical line topology can no longer be satisfied.

A good operational capability or operational readiness is achieved in systems of this type on the power electronics side by means of redundant power cells. The system design defines a number x of power cells, which can fail permissibly before the system has to be shut down. In the event of a loss of up to x power cells, the system should continue to function continuously without interruption and without the need for repairs. A redundant design of the number of power cells can be in conflict with a physical line typology of remote I/O devices.

SUMMARY

On this basis, an object of the present invention is to create a control device and a control method which are suitable for controlling power-electronics units or installations having a large number of power cells, in particular for large power converters having a large number of power semiconductor switching elements. In particular, the control device and the control method should enable good input and output capabilities and high control performances. They should also be suitable for redundant systems.

In accordance with one aspect of the invention, a control device for a power converter is provided, which comprises a number of power cells which each have at least one power semiconductor switching element and a remote input/output (I/O) device for communication with a central control unit in order to receive information, including commands for switching the at least one power semiconductor switching element, from the central control unit and in order to send response information from the power cell to the central control unit. The control device comprises at least one multiplexer/demultiplexer (MDM) device, which comprises an uplink port for connection to a central control unit, a plurality of downlink ports for direct connection to respective one remote I/O device of an associated power cell, and a communications control and management module. The communications control and management module is configured to extract information, relating to particular power cells, from a transmit frame received from the central control unit via the uplink port and to supply this to the corresponding downlink port for the relevant power cell and to insert response information obtained from particular power cells into a receive frame and to send this to the central control unit via the uplink port.

The invention uses a cascadable multiplexer/demultiplexer (MDM) device, which is inserted between a central control unit and the power cells with their integrated remote input and output (I/O) devices, and which comprises the at least one uplink port for connection to the central control unit and a plurality of downlink ports, up to 20 or even more, for the input and output control of the power cells. In the standard technical terminology, an uplink is understood to mean a connection with data flow from a subscriber to the network, herein from a power cell in the direction of the central control unit. Accordingly, a downlink designates a connection with data flow direction from the network to the subscriber, i.e. from the central control unit in the direction of the power cells. The configuration of the MDM device with at least one uplink and a plurality of downlinks and a logic for managing the data flow in order to appropriately divide data frames from the central control unit among the corresponding downlink ports and to pack together the response data of the power cells for transmission to the central control unit creates the basis for a cascaded control topology or architecture, which enables quick transmission times with short delay times from the central control unit to all power cells, and vice versa.

Each remote I/O device is directly connected via a connection to the downlink port of an MDM device. There is no logical or physical line topology for the remote I/O devices. In addition, the functionality of the communications control and management module is integrated in the MDM device. The communications control and management module established in the MDM device extracts, from the transmit frame received via the uplink port, the information intended for each downlink port and the power cell connected thereto, and also packs all receive frames, which contain response information from the power cells, together in the correct format so as to send these via the uplink port to the central control unit. The MDM device with the integrated communications control and management module enables good input/output capabilities and high control performances.

The control device according to the invention is suitable for a very wide range of power-electronics units and installations having a high number of power cells for different applications. In a preferred embodiment, said device is intended and configured for a multi-phase power converter which comprises a number of phase branches corresponding to the number of phases, wherein each phase branch comprises a first and a second branch, which are connected in series with one another between a first and a second DC voltage terminal. The connection point between the branches forms an AC voltage terminal of the corresponding phase branch. Each branch comprises a multiplicity of power cells, wherein each power cell has at least one power semiconductor switching element. By way of example, in the case of a three-phase power converter, six branches each with, for example, 300 or more power cells connected in series with one another per branch can be provided. A power converter of this type is well suited for example for high-voltage direct current (HVDC) applications.

In one configuration the power cell can have a full-bridge or H-bridge circuit comprising a first and a second bridge branch, wherein each bridge branch comprises a series circuit which is connected between DC voltage terminals of the bridge circuit and which is formed of at least one first and at least one second power semiconductor switch, the connection point of which forms an AC voltage terminal of the bridge circuit. Instead of the symmetrical H-bridge, an asymmetrical H-bridge circuit can also be used, in which the power semiconductor switches on a bridge diagonal are replaced by diodes. Half-bridges or individual high-power semiconductor switching elements, for example thyristors, could also be used. For example, IGBTs, MOSFETs, IGCTs, or the like can be used as power semiconductor switches. Each power cell also has sensors, which detect the parameters, such as voltages, currents, temperature, or the like, within or at the power cell in order to communicate these to the central control unit.

The control device in the broader sense (or a control system formed in this way) can also include the remote I/O devices of the connected power cells. These are the sole decentralised units of the control device or of the control system, which otherwise can be set up centrally. The remote I/O devices comprise a communications interface, which is connected and configured to send switching commands received from the central control unit to the at least one power semiconductor switch of an associated power cell and to receive, as responses, measured values of sensors of the power cell and to forward these to the central control unit. The remote I/O devices could optionally also have processing capabilities, for example in order to respond to received response signals with suitable commands for protecting the power cell or in order to switch off the power cell, for example to switch said power cell into a stable short circuit.

The communications control and management module provides for the correct distribution of the individual information items from the transmit frame among the power cells and for the correct transmission of the response information items from the connected power cells to the correct point in the receive frame. The communications control and managing module can also be configured to extract broadcast information, which is directed to all connected power cells, from the received transmit frame and to attach this extracted broadcast information to all extracted information intended for particular power cells and to send this in the form of a new transmit frame to the power cells. The broadcast information also can be transmitted quickly to all power cells, with little delay.

In addition, the communications control and management module can also be configured to insert all response information received from the connected power cells together with information intended to be precalculated by the communications control and management module into a receive frame and to provide this information at the uplink port for transmission to the central control unit. The information precalculated by the communications control and management module can be, for example, predefined functions of received sensor values, and the like. In this respect, the communications control and management module also has processing capabilities.

The MDM devices with an uplink port and a plurality of downlink ports also make it possible to construct a cascade structure for the control device. The control device can thus comprise at least two cascaded levels of MDM devices comprising at least one MDM device in a first level, which MDM device is directly connected to the central control unit, and a plurality of MDM devices in a second or further level, which is arranged between the at least one MDM device of the first level and a plurality of power cells. When, by way of example, an MDM device having an uplink port and 20 downlink ports is used, an MDM device of the second level can be connected to each downlink port of the MDM device of the first level, such that with just two levels up to 400 power cells can be controlled. It is also possible for more than two cascaded levels to be provided. The output signal of the MDM unit of a higher level is then made available as input of the MDM unit of a subsequent lower level or is connected thereto. A star architecture or topology suitable for the respective application and the corresponding requirements can thus be created.

The control device also comprises a central control unit for controlling the power cells. In a preferred embodiment the central control unit can comprise a multi-core CPU and a plurality of communications interfaces, wherein the power converter has a bridge configuration having a number of branches, and wherein each branch is assigned an individual CPU core of the multi-core CPU and an individual communications interface. By way of example, six multi-core CPUs can be provided for six branches of a three-phase power converter, wherein a CPU core controls or communicates with an individual branch via an associated communications interface. The control and communications tasks can be better structured, simplified, and accelerated on account of the division and parallel processing.

The multi-core CPU can also contain at least one CPU core that is additional to the CPU cores assigned to the branches. By way of example, an additional CPU core can be provided for central control tasks, and a further CPU core can be provided for system tasks. A very powerful control system can be created.

The invention also offers multiple possibilities for improving the operational capability or operational readiness. By way of example, each branch can have a number n of power cells necessary for operation of the branch and additionally a number x of redundant power cells. The central control unit is then configured, in the case of failure of a power cell, to address the corresponding switching commands to the redundant power cell, which takes over the function of the defective power cell.

In a particularly preferred embodiment, a redundant control unit or a redundant controller is also provided, which constitutes a duplicate of a corresponding CPU core and is connected to all power cells of a branch of the power converter via a further communications port of the remote I/O devices so as to take on the control of the branch, as necessary, in the event of a fault in the central control unit or a fault in an MDM device or in a transmission path. The redundant power cells and the redundant control unit(s) make it possible to continue the operation of the power converter in a wide range of fault situations, without having to stop or shut down said power converter.

The remote I/O devices and the MDM devices are each implemented in hardware or also as FPGAs, whereas the connection cables can be provided as copper or fibre optic cables. The transmission and receiving devices or input/output interfaces, such as the uplink and downlink ports and the communications interfaces of the remote I/O devices, are each formed as gigabit Ethernet interfaces. They can be configured for example in accordance with IEEE 802.3z for gigabit Ethernet via fibre optics, or in accordance with IEEE 802.3AB for gigabit Ethernet via UTP cable. Of course, other techniques and protocols are also possible, in particular for digital serial data transmission, for example via the RS-485 standard, or the like.

The control device can include further units or devices, for example for synchronization of the central control unit with the redundant control unit, or the like.

In accordance with a further aspect of the invention, a method for controlling a power converter is provided, which power converter has a number of power cells which each comprise at least one power semiconductor switching element and a remote input/output (I/O) device for communication with a central control unit in order to receive information, including commands for switching the at least one power semiconductor switching element, from the central control unit and in order to send response information from the power cell to the central control unit. The method includes a step of providing at least one multiplexer/demultiplexer (MDM) device comprising at least one uplink port, which is connected to the central control unit for communication therewith, a plurality of downlink ports, which are each directly connected to a remote I/O device of an associated power cell, and a communications control and management module. The method also comprises a step of receiving a transmit frame from the central control unit at the MDM device via the uplink port. The method further comprises a step of extracting information, relating to particular power cells, from the received transmit frame by means of the communications control and management module and providing the corresponding information at the downlink ports of the least one MDM device associated with the relevant power cells so as to send said information to the remote I/O devices of the relevant power cells. The method further comprises a step of receiving response information from the connected power cells via the associated remote I/O devices thereof at the downlink ports of the at least one MDM device. Moreover, the method comprises a step of inserting the received response information into a receive frame by means of the communications control and management module and providing the receive frame at the uplink port of the MDM device in order to send said receive frame to the central control unit. The control method according to the invention offers the same advantages of good input and output capabilities and high control performance as the control device and also creates the basis for a high operational capability and operational readiness. Possible further modifications of the control method correspond, inter alia, to those of the control device.

BRIEF DESCRIPTION OF THE DRAWINGS

Further advantageous details of embodiments of the invention will become apparent from the dependent claims, the drawing, and the associated description. The invention will be described in greater detail hereinafter on the basis of a drawing, which shows exemplary, non-limiting embodiments of the invention, wherein like reference signs are used in all Figures to denote like elements. In the Figures:

DETAILED DESCRIPTION

Figure 1:
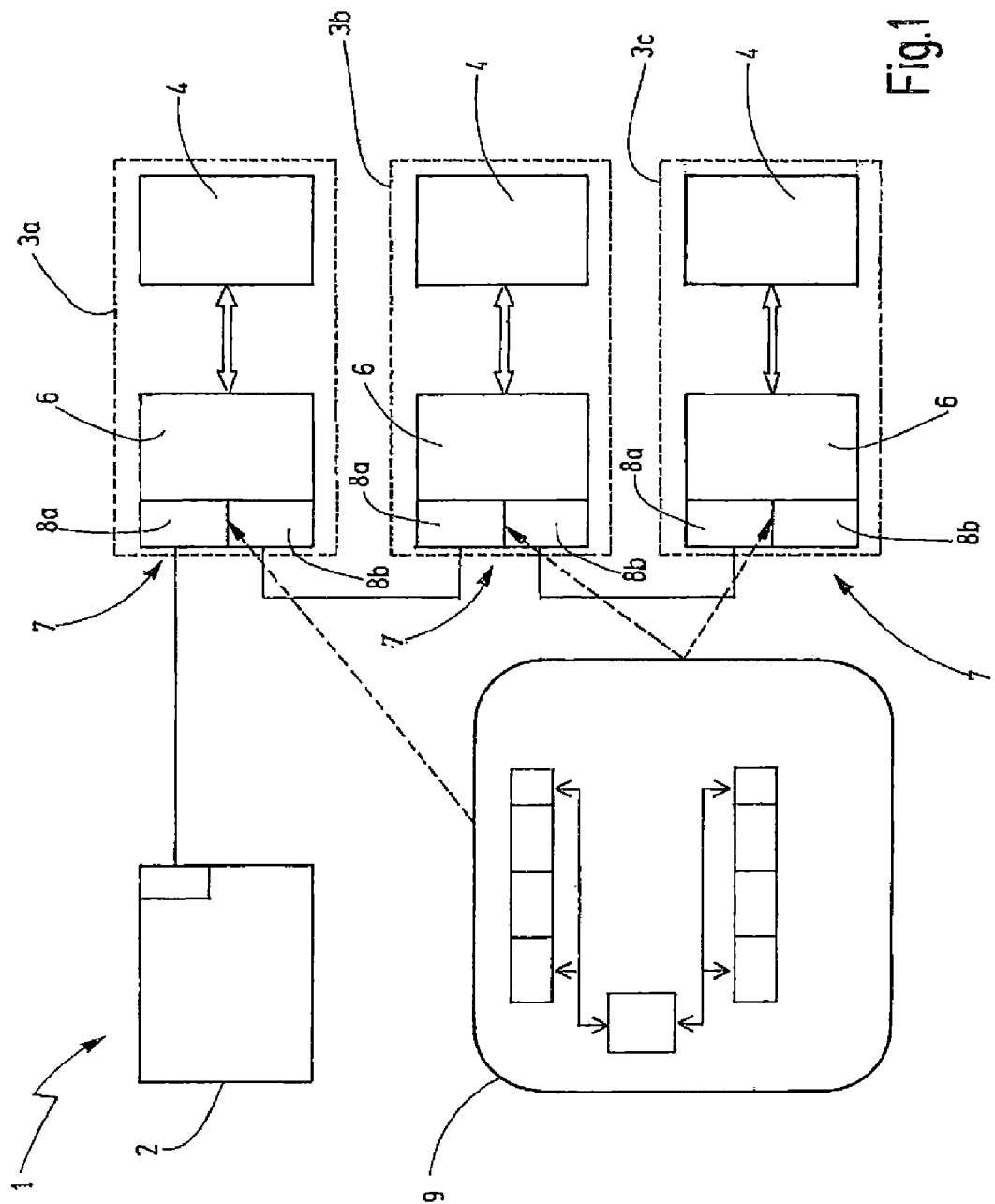
FIG. 1 shows an exemplary conventional control device for power converters in a line topology, in a very simplified schematic diagram.

Reference will now be made to embodiments of the invention which are illustrated in the drawings. It should be clear that the embodiments illustrated in the drawings are merely exemplary and do not limit the invention as such. Rather, the embodiments are merely intended to explain possible embodiments and to allow a person skilled in the art to carry out the invention. It should also be clear that, in an endeavour to provide a concise description of possible embodiments, it may be that not all details comprised by the scope of the invention can be specified.

Figure 2:
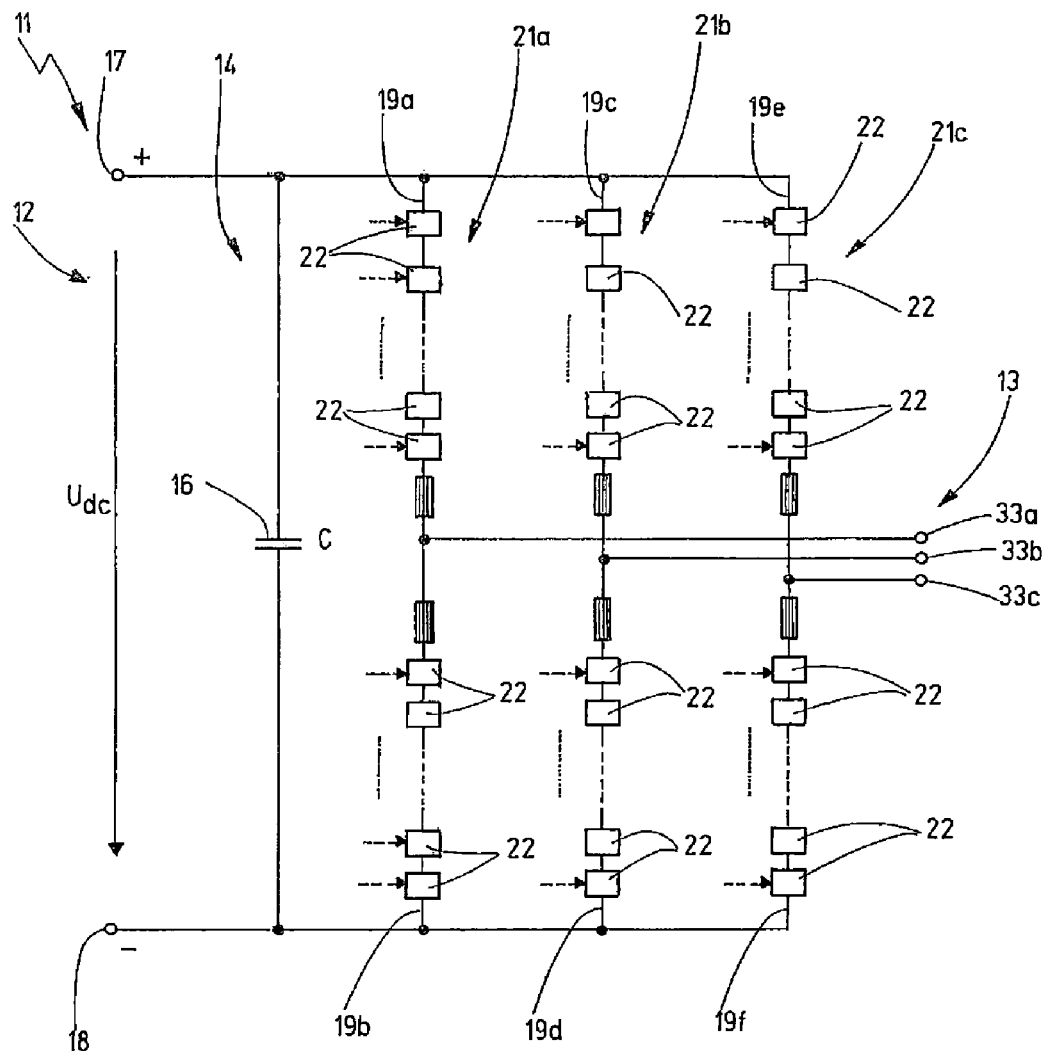
FIG. 2 shows an exemplary power converter for high-power or high-voltage applications in a simplified illustration.

The present invention relates to a control device and a control method for controlling large power-electronics units or installations comprising a number of power cells which receive commands from a central control unit and send responses to the central control unit. By way of example, the control device and the control method according to the present invention are suitable for controlling very large power converters, as are used for high-voltage or high-power applications. An exemplary embodiment of a power converter 11 of this type is illustrated in FIG. 2. The illustrated power converter 11 can be used, for example, for a high-voltage direct-current distribution system for electrical energy transfer at high DC voltage or for many other applications. In particular, the power converter 11 is configured to convert a DC voltage applied to its DC voltage side 12 into an AC voltage on its AC voltage side 13, or vice versa. The DC voltage side 12 can be connected via a direct current transmission device (not illustrated herein in greater detail) to another power supply network or electrical converter similar to the power converter 11 or to a DC voltage source, for example a solar cell or the like. The AC voltage side 13 can be connected to an electrical power supply network, an electrical alternating current (AC) machine, an AC generator, a wind turbine, or the like. The power converter 11 has, on the DC voltage side 12, a DC link 14, which is formed herein by a capacitor 16, which is connected between DC voltage terminals 17, 18 of the power converter 11 in order to store DC voltage energy.

As can also be seen from FIG. 2, the power converter in this case has six power converter branches 19A-F, which in pairs (an upper and a lower 19A, 19B and 19C, 19D and 19E, 19F) form a corresponding phase branch 21A, 21B and 21C. Each phase branch 21a-c extends between the first, for example positive DC voltage terminal ("+") 17 and the second, for example negative DC voltage terminal ("−") 18.

Each power converter branch 19A-F has a series circuit formed of a multiplicity of power converter power cells or sub-modules 22 connected in series. The controllable DC voltage at the DC voltage terminals 17, 18 of the power converter 11 can be dynamically changed via the switched states of the power cells 22. The number of power cells 22 herein determines the available number of power converter switched states, which enable a fine voltage gradation and a high-quality voltage form as well as high voltage levels up to high-voltage direct current (HVDC) transmission levels. The power converter 11 can be a modular multi-level or multi-point power converter. The power cells 22 will be explained in greater detail hereinafter in conjunction with FIGS. 3 and 5.

Figure 3:
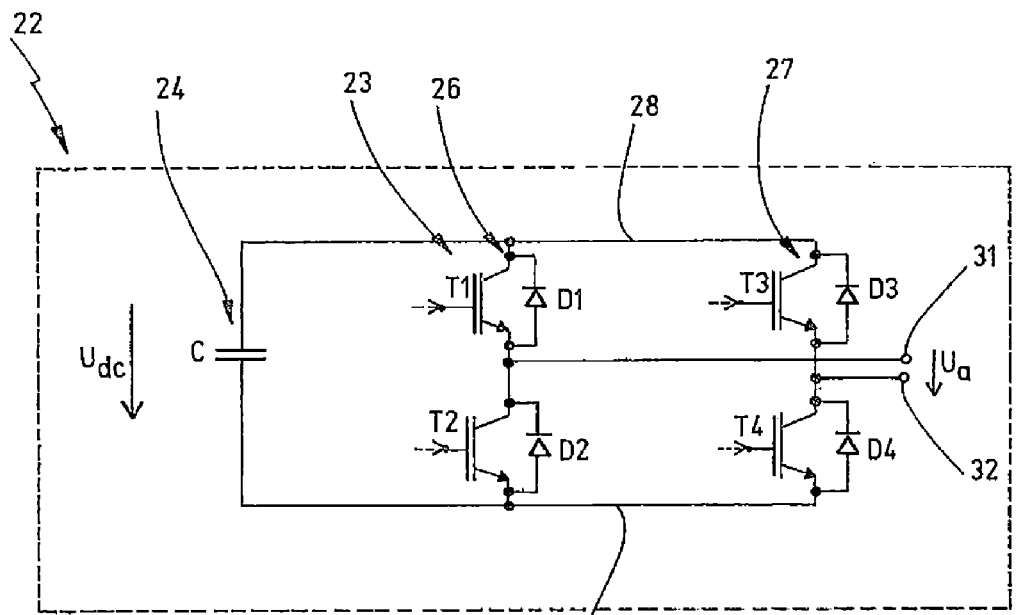
FIG. 3 shows a power electronics circuit for a power cell which can be used in the power converter according to FIG. 2, in a simplified illustration.

FIG. 3 shows, in the form of a simplified circuit diagram, an embodiment of a power-electronics circuit for a power cell 22 in accordance with a topology known per se, as can be used in the power converter 11 of the type shown in FIG. 1. The power cell 22 has a bridge circuit 23 and a capacitor C, 24 connected parallel to the bridge circuit 23. The bridge circuit 23 is formed herein as what is known as a symmetrical H-bridge or full bridge having two parallel power semiconductor branches 26, 27, which are connected parallel to one another between a first and a second DC voltage node 28, 29. The first power semiconductor branch 26 has a series circuit formed of a first power semiconductor switch T1 and a second power semiconductor switch T2, wherein anti-parallel freewheeling diodes D1, D2, that is to say freewheeling diodes connected in parallel in the opposite direction, are assigned to the first and the second power semiconductor switches T1, T2, respectively. The freewheeling diodes D1, D2 serve, when the power semiconductor switches T1 and T2 are switched off, to guide operating current and to protect the associated power switch against inadmissible over-voltages or blocking voltages.

Similarly, the second power semiconductor branch 27 has a series circuit formed of a third and a fourth power semiconductor switch T3, T4, with freewheeling diodes D3 and D4 being connected anti-parallel thereto, respectively. The freewheeling diodes D3, D4 perform the same function as the freewheeling diodes D1, D2.

The power semiconductor switches T1-T4 are controllable switches, which herein are formed by IGBTs (insulated gate bipolar transistors). In principle, other transistors could also be used, however, such as field-effect transistors, in particular MOSFETs, gate-turn-off (GTO) thyristors, IGC thyristors (integrated gate-commutated thyristors, IGCTs) and other comparable switchable electronic components.

The connection point between the first and the second power semiconductor switches T1 and T2 of the first power semiconductor branch 26 forms a first AC voltage terminal 31 of the power cell 22, whereas the connection point between the third and the fourth power semiconductor switches T3, T4 in the second power semiconductor branch 27 forms a second AC voltage terminal 28 of the power cell 22.

The capacitor C, 24 serving as energy store is connected parallel to the two power semiconductor branches 26, 27 connected in parallel and can also be referred to as a DC link capacitor of the sub-module. The DC voltage $u_{dc}$ at the capacitor C is always positive on account of the connection of the freewheeling diodes D1-D4 and can be between a few hundred volts and a few kV for example, depending on sizing and application. The terminal voltage $u_a$ between the AC terminals 31, 32 of the power cell 22 can assume, substantially, the values $-u_{dc}$, $+u_{dc}$ or 0. The DC voltage $u_{dc}$ at the capacitor C can be greater or smaller. A current can flow through the power cell 22 in principle in both directions, from the terminal 31 to the terminal 32 or vice versa.

The individual power cells 22 are connected in series to one another in order to form the power converter branches 19A-F of the power converter 11 according to FIG. 2. A multiplicity of power cells 22 of this type, up to 300 power cells or more, can be connected together in order to form the individual power converter branches 19a-f. At the connection point between the associated power converter branches 19A, 19B and 19C, 19D and 19E, 19F, the corresponding AC voltage terminals 33A, 33B and 33C of the power converter 11 are led out and are connected to an AC voltage source or sink.

By suitable control of the power semiconductor switches T1-T4 of the individual power cells 22 of the power converter 11, the DC voltage on the DC voltage side 12 can be converted into an AC voltage of a desired amplitude and frequency on the AC voltage side 13 of the power converter 11, or vice versa. For this purpose, the power semiconductor switches T1, T4 receive corresponding switch commands from a control device, as is shown in FIGS. 2 and 3 by means of control lines indicated in a dashed manner. The control device will be explained in greater detail hereinafter in conjunction with FIG. 4.

It should be noted that the H-bridge circuit 23 illustrated in FIG. 3 is merely a preferred embodiment of a power-electronics circuit for the power cell 22. Other circuits, such as a half-bridge or the like, could also be used. A power cell 22 could in principle also have just a single power semiconductor switch, for example a thyristor or the like.

Figure 4:
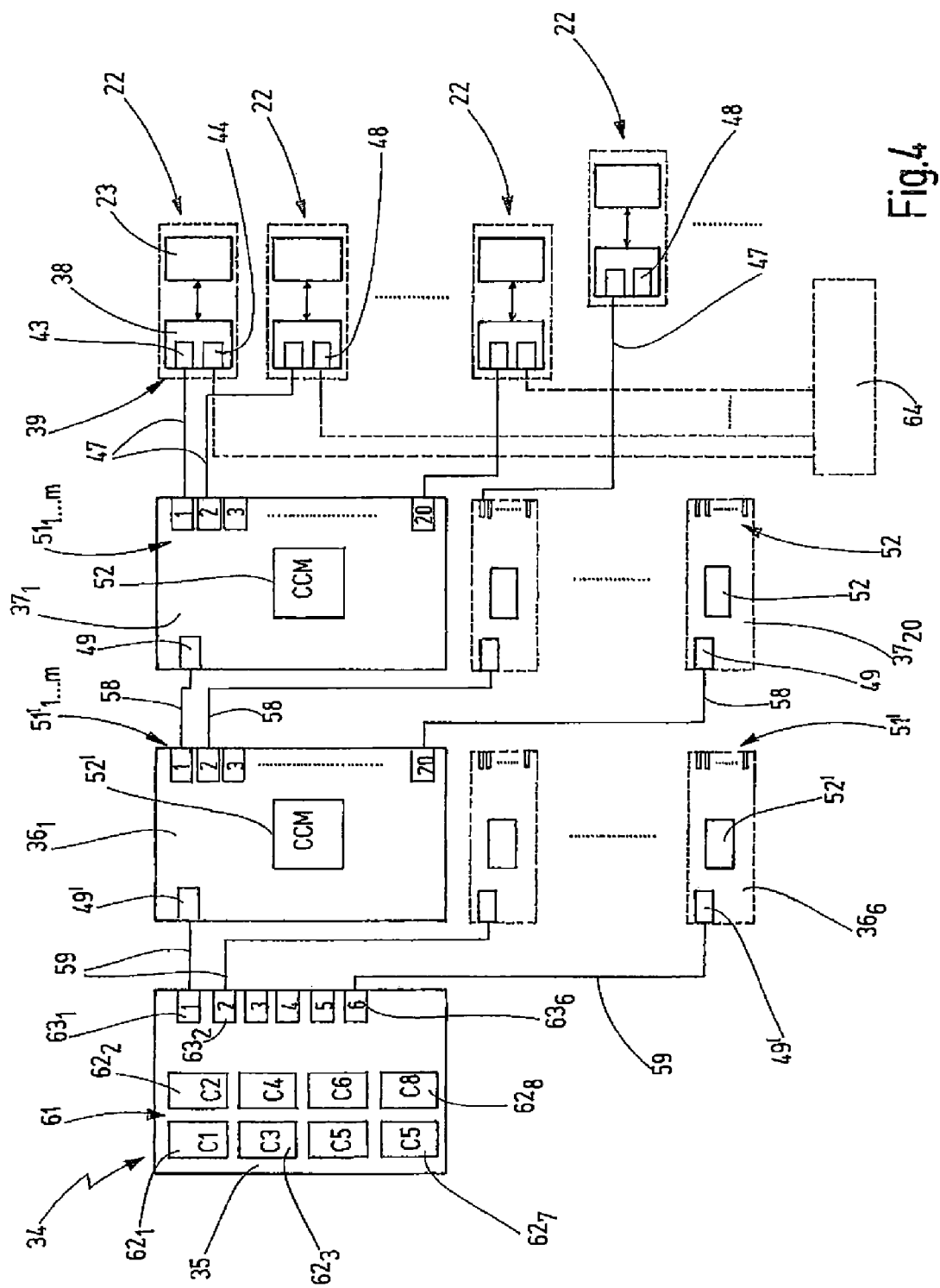
FIG. 4 shows an embodiment of a control device according to the invention for example for controlling the power converter according to FIG. 2, in a simplified block diagram.

FIG. 4 shows an exemplary embodiment of a control device 34 in accordance with an embodiment of the present invention. The control device 34 is configured to control large power-electronics units or installations having a multiplicity of power cells, such as the large power converter 11 having the multiplicity of power cells 22, as illustrated in FIGS. 2 and 3. In the illustrated exemplary embodiment, the control device 34 has a central control unit 35, a number of multiplexer/demultiplexer (MDM) devices 36 of a first level, and a number of multiplexer/demultiplexer (MDM) devices 37 of a second level, which are connected to a multiplicity of power cells 22 for control and communication.

Figure 5:
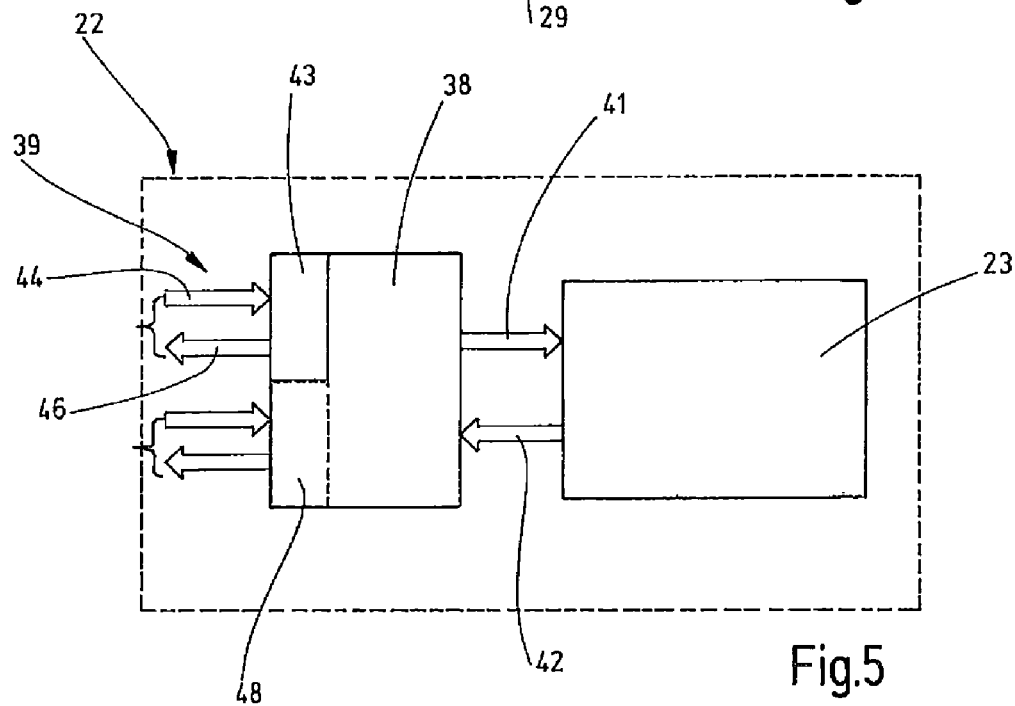
FIG. 5 shows an exemplary power cell with a remote I/O interface device for use in the control device according to FIG. 4 in a very simplified block diagram.

As can also be seen in greater detail in FIG. 5, each power cell 22 includes a remote input/output (I/O) device (RIO device for short) 38 for communication with the control device 34, which RIO device is assigned solely to the corresponding individual power cell 22. The RIO device 38 comprises a communications interface 39 and is configured to receive information, in particular switch commands for the actuators or power semiconductor switches of the power cell 22, from the central control unit 35 via the communications interface 39 and to forward said information in the form of commands 41 in order to control the power semiconductor switches T1-T4 of the bridge circuit 23 of the power cell 22. The RIO device 38 is also configured to transmit responses 22 from the power cell 22, for example measurement values of sensors (not illustrated herein) provided in the power cell 22 for measuring voltages, currents, temperature, and the like, to the central control unit 35 via the communications interface 39.

The communications interface 39 is configured for bidirectional communication in order to receive information 44 from the central control unit 35 via a single terminal 43 and also to send response information 46 to the central control unit 35 via a single communications line 47. Of course, the communications interface 39 could also provide separate terminals for receiving and sending data.

As can also be seen from FIG. 5, the RIO device 38 can optionally comprise a further communications interface 48, which can be provided herein for communication with further modules of the control device 34, such as a redundant control device. This further communications interface 48 is absolutely necessary in the case of the conventional line topology shown in FIG. 1 for connection to subsequent power cells. Due to the cascaded topology or star architecture of the control device 34 according to the invention, the further communications interface 48 is not necessary for connection to subsequent power cells and can also be omitted.

The RIO device 38 can have limited processing capabilities, for example so as to be able to directly respond to the responses 42 of the power cell 22 and, in the event of a fault, switch the power semiconductor switches T1-T4 of the power cell 22 into a stable state, for example a stable short circuit or the like, so as to switch off the power cell, yet enable continued operation of the power converter 11. Additional processing capabilities of this type, however, are not necessary. In the event of a fault, the central control unit 35 can transmit corresponding commands in order to switch off or protect the relevant power cell 22 as necessary.

In addition, the RIO device 38 can be provided using field-programmable gate arrays (FPGAs). The communications interface 39 is configured as a gigabit Ethernet interface, which enables high-speed communication via the communications cable 47 in accordance with a corresponding gigabit Ethernet standard, such as IEEE 802.3z for communication via fibre optic cables, or IEEE 802.3AB for communication via twisted-pair cables, for example copper cables. Other technologies are also possible.

Referring back again to FIG. 4, it can be seen that each power cell 22 is connected via its associated RIO device 38 and the communications line 47 between multiplexer/demultiplexer (MDM) device 37 from the number of MDM devices 37$_{1\ldots1}$ of the second level. As can be seen from FIG. 4, a plurality (1) of such MDM devices 37$_{1\ldots1}$ can be provided in order to be able to connect a multiplicity of power cells 22.

Figure 6:
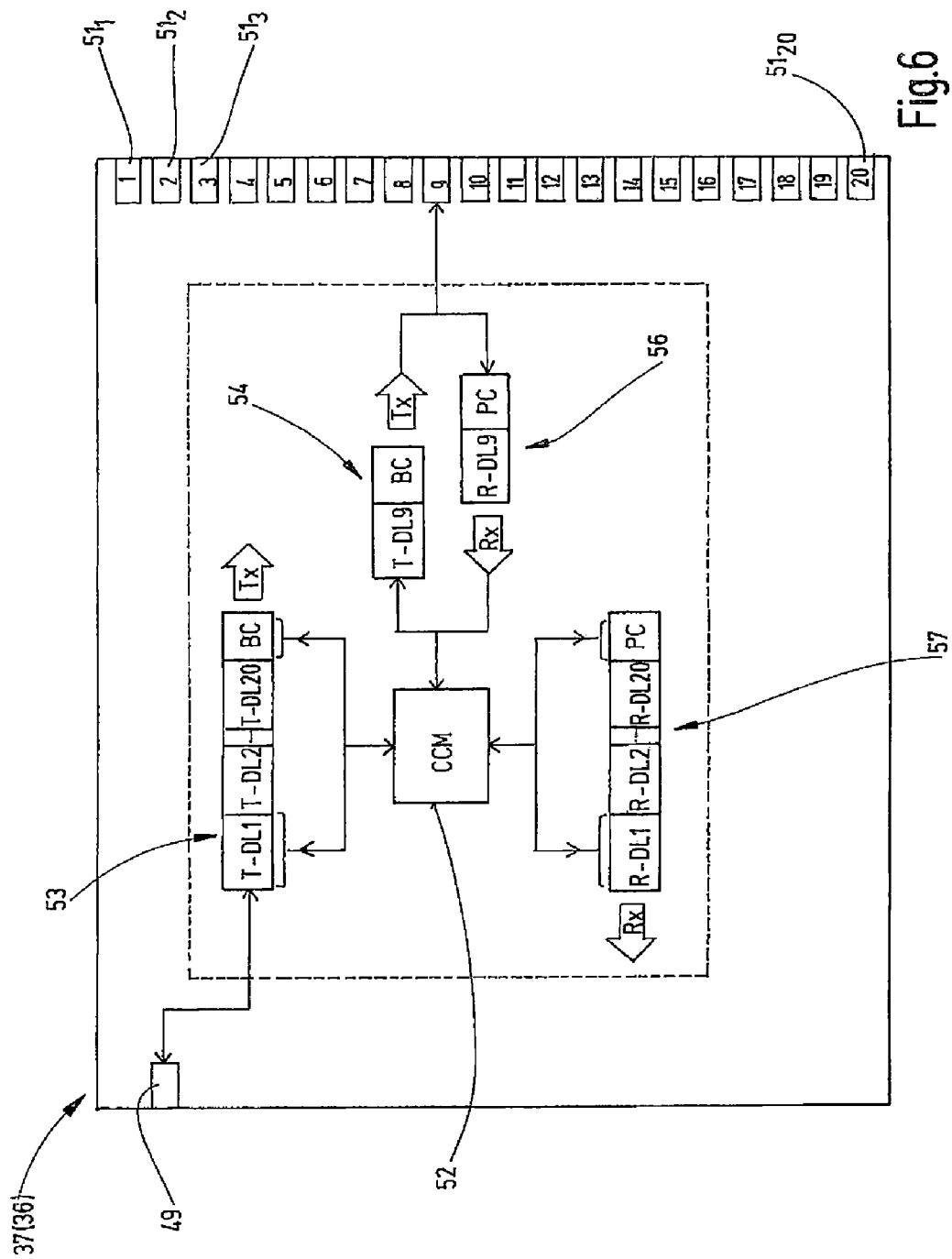
FIG. 6 shows a multiplexer/demultiplexer device for use in the control device according to FIG. 4, in a schematic diagram.

The structure of the MDM device 37 is illustrated in greater detail in FIG. 6. The MDM device 37 has at least one uplink port 49 for connection to the central control unit 35, a plurality of downlink ports 51$_{1\ldots m}$, which are each directly connected to a communications interface 39 of an associated RIO device 38, and a communications control and management module 52.

In the case of the MDM device 37 according to the invention, a single uplink port 49 is sufficient for connection to the central control unit 35. However, the MDM device 37 can also have two or more uplink ports, if this is desired or if required by the particular application. These are not necessary, however, for the control device 34 according to the invention.

In the illustrated example the MDM device 37 has 20 downlink ports 51, which are each directly connected to an individual RIO device 38. Of course, the number m=20 of downlink ports is merely exemplary, and the MDM device 38 can include more than or fewer than 20 downlink ports 51.

The communications and management module 52, which will be referred to hereinafter as a CCM (communication control manager) module for short, is the central functional unit of the MDM device 37. As shown in FIG. 6, the CCM module 52 extracts, from a transmit frame 53, which is received from the central control unit via the uplink port 49 of the MDM device 38, the information T-DL1 . . . T-DLm intended for each occupied downlink port 65$_{1\ldots m}$, i.e. each power cell 22 connected thereto. The CCM module 52 also extracts broadcast information BC from the transmit frame (Tx) 53, which broadcast information is directed to all connected power cells 22, and adds the extracted broadcast information BC to the information T-DL1 . . . T-DLm intended for each connected power cell so as to form a new transmit frame 54 intended for a particular power cell 22. This is illustrated in FIG. 6 for the ninth downlink port 51$_9$ on the basis of the new transmit frame 54, which contains the information T-DL9 intended for the downlink port 51$_9$ and the broadcast information (BC).

The CCM module 52 also receives all receive frames containing the response information R-DL1 to R-DLm from all connected power cells 22, such as sensor information, jointly with information PC which is to be precalculated by the CCM module. The latter by way of example can be a sum of the current sensor values, a mean value thereof, or any other desired function of the sensor values from one or more of the connected power cells 22. The CCM module 52 then packs all received receive frames 56 R-DL1 . . . R-LDm together in correct format to form a new receive frame 57 and adds the precalculated information PC, so as to form the complete new receive frame (Rx) 57, which is sent via the uplink port 49 in the direction of the central control unit 35.

Referring again to FIG. 4, the MDM devices 36, 37 are cascaded in a number of levels. Although two levels are shown herein, the number of levels is not limited by the described example. It is possible for more than two levels to be provided. In a reduced architecture, just a single level can also be provided, which contains one or more MDM devices 37 between the central control unit 35 and the power cells 22. An architecture having at least two levels is preferred for the preferred application in conjunction with large power converters, such as the power converter 11 according to FIG. 2 or comparable large power-electronics units having a large number of power cells.

In the illustrated preferred configuration, two levels are provided, with one or more MDM devices 36$_{1\ldots k}$ of the first level, which are cascaded with the MDM devices 37$_{1\ldots1}$ of the second level. In particular, k=6 MDM devices 36$_1$ to 36$_6$ of the first level are provided, corresponding to the number of six power converter branches 19a-f, each of said MDM devices being connected to a number of, in the present case 20, MDM devices 37$_1$ to 37$_{20}$ of the second level. The MDM devices 36 of the first level are formed herein identically to the MDM devices 37 of the second level. They each have an uplink port 49' and a plurality of downlink ports 51', herein 20 downlink ports, wherein each downlink port 51' is connected to the uplink port 49 of an individual subsequent MDM device 37 for communication therewith. Again, copper cables, in particular twisted-pair cables, or fibre optic cables, could be used as connection cables 58.

Each MDM device 36 of the first level also has a communications control and management module (CCM module) 52', which serves to extract, from the transmit frame T$_x$ received from the central control unit 35 via the uplink 49', the information T-DL1 to T-DL20 determined for each occupied downlink port 51'$_{1\ldots m}$ and to send this together with broadcast information BC in a new transmit frame to each downlink port 51'$_{1\ldots m}$ and also to receive all receive frames Rx containing response information from the power cells 22, said information being transmitted via the connected second MDM devices 37, and to provide this information, jointly with information PC possibly additionally precalculated in advance, at the uplink port 49' so as to transmit it via a communications line 59 to the central control unit 35.

The central control unit (CPU) 35 is formed in the illustrated example and in accordance with a preferred embodiment with a multi-core CPU 61, which in the present example has eight CPU cores 62$_1$ to 62$_8$, and with a plurality of, in the present case six, communications interfaces 63$_1$ to 63$_6$. In each case one CPU core 62$_1$ to 62$_6$ and one individual communications interface 63$_1$ to 63$_6$ are assigned to an individual power converter branch 19a-f so as to control this. In this respect, a first CPU core 62$_1$ is connected via a first communications interface 63$_1$ to a first MDM device 36$_1$ of the first level for communication therewith, said first MDM device having connected thereto all second MDM devices 37 which are connected to power cells 22 of the first power converter branch 19a. Similarly, a second CPU core 61$_2$ is connected via a second communications interface 63$_2$ to a second MDM device 36$_2$ of the MDM devices of the first level, said second MDM device having connected thereto all MDM devices 37 of the second level which are connected to all power cells 22 belonging to the second power converter branch 19b. Similarly, the power converter branches 19c-f are also each assigned an individual CPU core 62$_3$ to 62$_6$, an associated communications interface 63$_3$ to 63$_6$, an associated MDM device 36$_3$ to 36$_6$ of the first level, and a plurality of MDM devices 37$_{1\ldots1}$ of the second level. In this way, each CPU core 62$_{1-6}$ can control the corresponding power converter branch 19a-f easily and quickly, parallel to the control of the other power converter branches, and can exchange information therewith quickly, with short delay times.

In the illustrated example having two levels, 20 MDM devices 37 of the second level can be connected to the downlink ports 51'$_1$ to 51'$_1$ 51'$_{20}$ of each MDM device 37 of the first level, which makes it possible to connect a total of up to 400 RIO devices 38 or power cells 22 for each power converter branch 19a-f to each communications interface $63_1$ to $63_6$, i.e. herein for example to connect a total of 2400 RIO devices 38 or power cells 22 to the central control unit 35.

The remaining two CPU cores $62_7$ and $62_8$ are optional, but, if provided, can take on central control tasks and system-related tasks, such that these tasks can be decoupled from the control of the power cells 22 in the power converter branches 19a-f and from the communication therewith. This also improves the simple implementation, clarity, controllability, and functional capability of the control system as a whole.

The control device 34 described in this respect functions as follows:

The central control unit 35 of the control device 34 can, by way of example, communicate in real-time with all power cells 22 of a connected power converter 11 and can control these by sending an individual transmit frame per cycle, which frame is transmitted to the power cells 22, and by receiving response information from the power cells 22 in an individual receive frame per cycle. With the topology according to the invention, high control performances combined with short cycle times can be achieved. Each CPU core $62_1$ to $62_6$ controls the power cells 22 associated with a power converter branch 19a-f and communicates therewith via the dedicated communications interface $63_1$ to $63_6$, the associated MDM device $36_{1 \ldots 6}$ of the first level, and the associated MDM devices $37_{1 \ldots 1}$ of the second level. The MDM devices 36 and 37 each extract the information for the power cells 22 of the corresponding power converter branch 19a-f connected downstream, in terms of the data flow direction, to the downlink ports 51, 51'. Conversely, the response information sent back from the power cells 22 of each power converter branch 19a-f is collated via the MDM devices $37_{1 \ldots 1}$ and $36_1$ to $36_6$ connected in cascade and is transmitted back to the central control unit 35.

In this way, commands can be sent in parallel to a high number of actuators, in the case of six power converter branches having, for example, 300 power cells per branch, for example a total of 1800 power cells and 7200 power semiconductor switches of the H-bridge circuits 23, and responses from a higher number of sensors can be received. The transmission, control and receiving operations can be performed in very ambitious, short cycle times. The communication delay time can be limited on account of the cascaded topology in two levels to just two delay times, i.e. for example 2*0.3 microseconds=0.6 microseconds, which, with a typical cycle time of 100 microseconds, for example, is negligible.

In addition, the control device 34 according to the invention can be provided using standard and generally obtainable components, including widespread multi-core CPUs, gigabit Ethernet communications adapters or interfaces, and programmable logic circuits, for example FPGAs, with relatively little effort and at low cost. The simple, clear and centralised structure of the control device 34 according to the invention simplifies the development, implementation and programming works and creates the basis for reliable and durable operation.

Numerous modifications are possible within the scope of the invention. By way of example, the central control unit 35 could also include just a single CPU core or fewer CPU cores 62 than power converter branches 19. The control and communications tasks can then be distributed appropriately among the available CPU cores. An arbitrary number of one or more MDM devices 36 of the first level and an arbitrary number of MDM devices 37 of the second level and possibly further levels can also be used, depending on the application and requirements. The MDM devices 36 and 37 of the various levels could also be formed differently, for example with different numbers of downlink ports 51 and 51'. The RIO device 38 can be replaced by an arbitrary communications interface, which enables a power cell 22 to communicate with other modules. Different communications modes are also possible, in which transmitted and received information can also be combined in a frame, or information can be divided between a number of transmit and receive frames. Although no addressing information is contained in the transmit and receive frames in accordance with the presented exemplary embodiment and the CCM modules 52, 52' know the point at which they can find or must insert the relevant information in the corresponding frame, different addressing modes can also be considered or integrated in the communication.

As further modification, the operational capability and operational readiness of the power-electronics system can be improved by providing redundant power cells 22. In particular, in addition to the n power cells 22, which are necessary for the operation of a power converter branch 19a-f, additional x power cells 22 can additionally be provided (not illustrated), such that x power cells can fail permissibly before the system has to be shut down. With the loss of up to x power cells, the system can continue to be operated without interruption and without the need for repair. Only when more than x power cells fail in a converter branch 19a-f does this or the entire power converter 11 have to be shut down.

The operational capability or operational readiness of the presented control system can be further improved by providing an additional redundant control unit 64 for each power converter branch 19a-f, which redundant control unit can be a complete duplicate of the associated CPU core $62_{1-6}$. The redundant control unit 64 is shown in FIG. 2. As can be seen, the redundant control unit 64 is connected to all RIO devices 38 via the further communications interface 48, which can be provided for this purpose. Each redundant control unit 64, in the event of a fault in the central control unit 35, for example a fault of a CPU core $62_{1-6}$ associated with the corresponding power converter branch 19a-f, or a fault in a relevant MDM device 36 or 37 or in a transmission path, takes on the monitoring of the associated power cells 22 of the power converter branch and control thereof. For synchronization of the CPU cores $62_{1-6}$ with the associated redundant control unit 64, for comparison of the data therebetween, etc., suitable synchronization and comparison devices can be provided.

Figure 7:
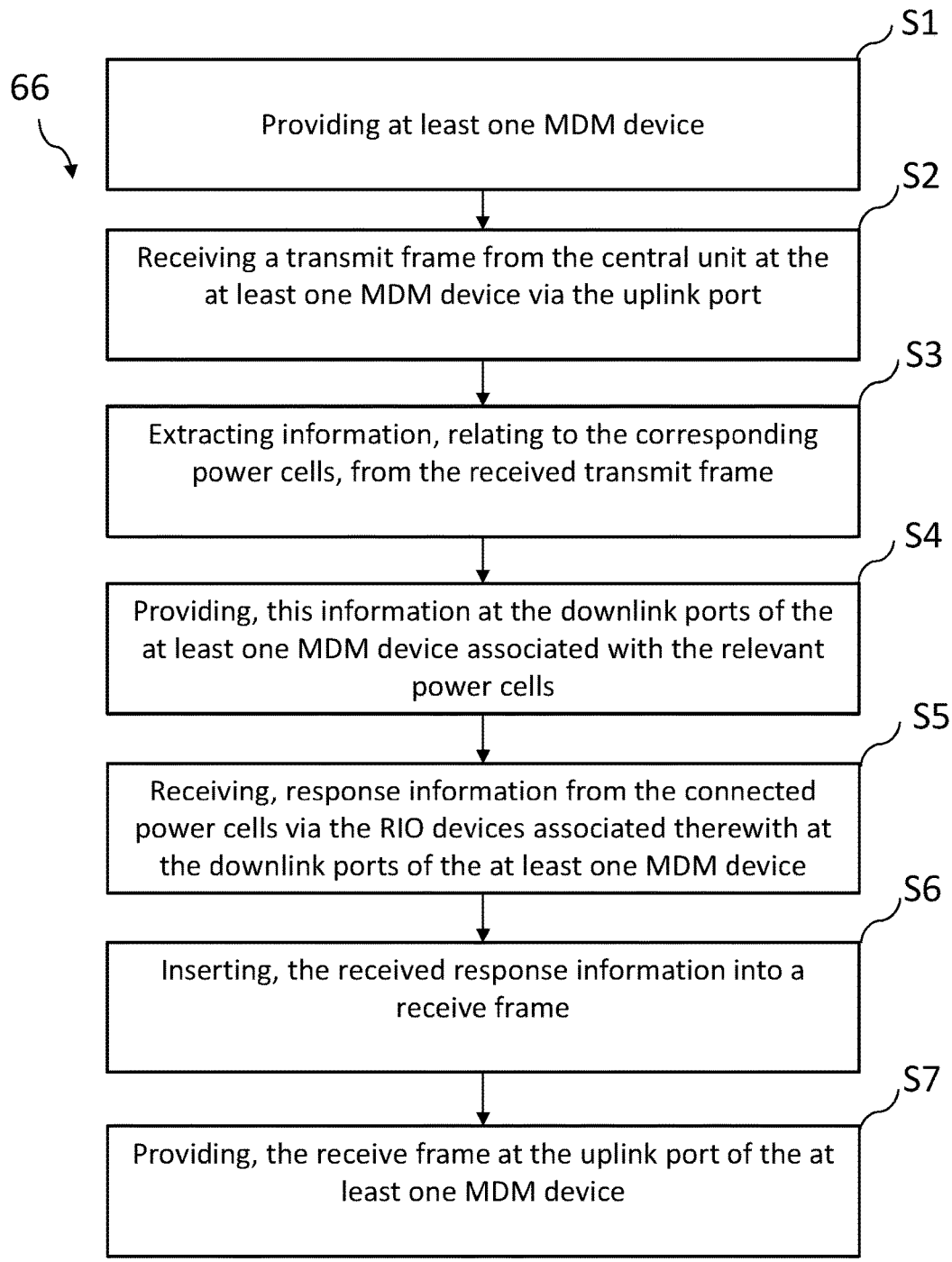
FIG. 7 shows a flow diagram of a control method for controlling, for example, the power converter according to FIG. 1, in a very simplified illustration.

FIG. 7 shows a flow diagram of a method for controlling a power converter or the like, comprising a number of power cells which each have at least one power semiconductor switching element and receive commands from a central control unit and send information to a central control unit, in accordance with an embodiment of the invention. Unless already provided, a remote input/output (I/O) device (RIO device), for example 38, having a communications interface, for example 39, is provided for each power cell, for example 22. The control method then includes the step S1 of providing at least one multiplexer/demultiplexer (MDM) device, for example 36, 37, having at least one uplink port, for example 49, 49', which is connected to the central control unit for communication therewith, a plurality of downlink ports, for example 51, 51', which are each directly connected to an RIO device of an associated power cell 22, and a communications control and management module (ECM module), for example 52, 52'. The method also includes the step S2 of receiving a transmit frame (Tx) from the central unit at the at least one MDM device via the uplink port. The method also includes steps S3 of extracting information, relating to the corresponding power cells, from the received transmit frame by means of the CCM module, and providing, S4, this information at the downlink ports of the at least one MDM device associated with the relevant power cells in order to send said information to the RIO devices of the relevant power cells. The method also includes a step of receiving, S5, response information from the connected power cells via the RIO devices associated therewith at the downlink ports of the at least one MDM device, inserting, S6, the received response information into a receive frame (Rx) by means of the CCM module, and providing, S7, the receive frame at the uplink port of the at least one MDM device so as to be able to send it to the central control unit.

The method can be designed for a multi-phase power converter, for example the power converter 11 according to FIG. 2, which comprises a plurality of power converter branches, for example 19a-f, wherein each branch comprises a multiplicity of power cells, for example 22, and wherein each power cell comprises at least one power semiconductor switching element, for example T1-T4, a plurality of power semiconductor switching elements connected to form a bridge circuit, for example 23.

In the control method of any of the above-mentioned types, the central control unit can send switching commands to actuators or power semiconductor switching elements of the power cells, and can receive measured values of sensors provided in the power cells, sent back by the power cells.

The CCM module can also extract broadcast information from the received transmit frame, which information is directed to all connected power cells, and can attach this extracted broadcast information to all extracted information intended for particular power cells and can send it in the form of a new transmit frame to the power cells.

Conversely, the CCM module can also insert all response information received from the connected power cells, together with information precalculated by the CCM module, into a receive frame and can provide this at the uplink port.

In a preferred embodiment of the control method, at least two cascaded levels of MDM devices, for example $36_{1...k}$ and $37_{1...l}$ are provided, including at least one MDM device 36 of a first level directly connected to a central control unit and a plurality of MDM devices 37 of a second or further level, which is connected between the at least one MDM device of the first level and the plurality of power cells.

The method can also include a step of providing a central control unit, for example 35, which can comprise a multi-core CPU, for example 61, and a plurality of communications interfaces $63_{1...6}$, in particular when the power converter has a bridge configuration with a plurality of branches 19a-f, wherein each branch is assigned an individual CPU core $62_{1-6}$ of the multi-core CPU, an individual communications interface $63_{1...6}$, an individual MDM device $36_{1...6}$ of the first level, and a plurality of MDM devices $37_{1...l}$ of the second level.

The method can also comprise a step of providing a number x of redundant power cells in each branch of the power converter greater than the number n of power cells necessary for operation of the branch in order to enable continued operation of the power converter in the event of failure of individual power cells. Additionally or alternatively, a redundant control unit, for example 64, can also be provided for each power converter branch and in each case constitutes a duplicate of a corresponding CPU core $62_{1-6}$ and is connected to the associated RIO device of the power converter branch via a further communications terminal, for example 48, of the RIO device, so as to take on the control of the associated power cells of the power converter branch, as necessary, in the event of a fault in the central control unit 35 or a fault in an MDM device 36 or 37, or in a transmission path.

A control device and a control method for large power converters 11 having a high number of power cells 22, which contain power semiconductor switching elements T1-T4 and which receive commands from a central control unit 35 and send information to the central control unit 35, are provided. The control device 34 comprises at least one multiplexer/demultiplexer (MDM) device 36, 37, which comprises an uplink port 49, 49' for connection to the central control unit 35 for communication therewith, a plurality of downlink ports 51, 51' for direct connection to a communications interface 39 of an associated power cell 22, and a communications control and management module 52, 52'. The communications control and management module 52, 52' is configured to extract information, relating to particular downstream power cells 22, from a transmit frame 53 received from the central control unit 35 via the uplink port 49, 49' and to feed this information to the corresponding downlink port 51, 51' for the relevant power cell 22 and to insert response information received from particular power cells 22 into a receive frame 56 and to send this via the uplink port 49, 49' to the central control unit 35.

The invention claimed is:

1. A control device for a power converter having a number of power cells which each comprise at least one power semiconductor switching element and a remote input/output device for communication with a central control unit in order to receive information, including commands for switching the at least one power semiconductor switching element, from the central control unit and in order to send response information from the power cell to the central control unit, wherein the control device comprises:
   at least one multiplexer/demultiplexer device, which comprises an uplink port for connection to the central control unit, a plurality of downlink ports for direct connection to respective one remote I/O device of an associated power cell, and a communications control and management module, which is configured to extract information, relating to particular power cells, from a transmit frame received from the central control unit via the uplink port and to supply this to the corresponding downlink port for the relevant power cell and to insert response information obtained from particular power cells into a receive frame and to send this to the central control unit via the uplink port.

2. The control device according to claim 1, wherein the control device is configured for a multi-phase power converter which has a number of phase branches corresponding to the number of phases, wherein each phase branch has a first and a second branch, which are connected to one another in series between a first and a second DC voltage terminal, wherein the connection point between the branches forms an AC voltage terminal of the corresponding phase branch, and wherein each branch has a multiplicity of power cells, wherein each power cell comprises at least one power semiconductor switching element.

3. The control device according to claim 2, wherein the power cell comprises an H-bridge circuit with a first and a second power semiconductor branch, wherein each power semiconductor branch has a series circuit which is connected between DC voltage terminals of the bridge circuit and which is formed of at least one first and at least one second power semiconductor switch, the connection point of which forms an AC voltage terminal of the bridge circuit.

4. The control device according to claim 1, further comprising the remote I/O devices of the connected power cells, wherein the remote I/O devices comprise a communications interface which is connected and configured to send switch commands received from the central control unit to power semiconductor switches of the associated power cell and to receive, as responses, measured values of sensors of the power cell, and to forward these to the central control unit.

5. The control device according to claim 1, wherein the communications control and management module is further configured to extract broadcast information from the received transmit frame, which information is directed to all connected power cells, and to attach this extracted broadcast information to all extracted information intended for particular power cells and to send this in the form of a new transmit frame to the power cells.

6. The control device according to claim 1, wherein the communications control and management module is further configured to insert all response information received from the connected power cells, together with information precalculated by the communications control and management module, into a new receive frame and to provide this at the uplink port.

7. The control device according to claim 1, comprising at least two cascaded levels of MDM devices comprising at least one MDM device in a first level, which MDM device is directly connected to a central control unit, and a plurality of MDM devices in a second or further level, which is arranged between the MDM device of the first level and a plurality of power cells.

8. The control device according to claim 1, further comprising a central control unit, which has a multi-core CPU and a plurality of communications interfaces, wherein the power converter has a bridge configuration with a plurality of branches, and wherein each branch is assigned an individual CPU core of the multi-core CPU and an individual communications interface.

9. The control device according to claim 8, wherein the multi-core CPU further comprises at least one additional CPU core for central control tasks and system tasks.

10. The control device according to claim 8, wherein each branch has a number of redundant power cells.

11. The control device according to claim 8, comprising a redundant control unit, which is connected to all remote I/O devices of power cells of a branch of the power converter via a further communications interface of the remote I/O devices so as to transfer the control of the associated power cells as necessary in the case of a fault in the central control unit or a fault in an MDM device or in a transmission path.

12. The control device according to claim 1, wherein the remote I/O devices and the MDM devices are each implemented in hardware or preferably in the form of FPGAs, connection and/or communication cables are realized as copper cables or fibre optic cables, and the uplink and downlink ports and communications interfaces are each formed as gigabit Ethernet interfaces.

13. A method for controlling a power converter, which has a large number of power cells, which each comprise at least one power semiconductor switching element and a remote input/output (I/O) device for communication with a central control unit in order to receive information, including commands for switching the at least one power semiconductor switching element, from the central control unit and in order to send response information from the power cell to the central control unit, wherein the method comprises the following steps:
providing at least one multiplexer/demultiplexer device having an uplink port, which is connected to the central control unit for communication therewith, a plurality of downlink ports, which are each directly connected to a remote I/O device of an associated power cell, and a communications control and management module;
receiving a transmit frame from the central control unit at the at least one MDM device via the uplink port;
extracting information, relating to particular power cells, from the received transmit frame by means of the communications control and management module and providing the corresponding information at the downlink ports of the least one MDM device associated with the relevant power cells so as to transmit said information to the remote I/O devices of the relevant power cells;
receiving response information from the connected power cells via the associated remote I/O devices thereof at the downlink ports of the at least one MDM device; and
inserting the received response information into a receive frame by means of the communications control and management module and providing the receive frame at the uplink port of the at least one MDM device in order to send said frame to the central control unit.

14. The method according to claim 13, wherein the power converter is a multi-phase power converter, which has a plurality of power converter branches (19a-f), wherein each branch comprises a multiplicity of power cells, and wherein each power cell comprises at least one power semiconductor switching element, preferably a plurality of power semiconductor switching elements connected to form a bridge circuit.

15. The method according to claim 13, wherein the central control unit sends switch commands to power semiconductor switching elements of the power cells, and the power cells send back current measured values of sensors to the central control unit as responses.

16. The method according to claim 13, wherein the communications control and management module further extracts broadcast information, directed to all connected power cells, from the received transmit frame and attaches this extracted broadcast information to all extracted information intended for particular power cells and sends this in the form of a new transmit frame to the power cells.

17. The method according to claim 13, wherein the communications control and management module further inserts all response information received from the connected power cells, together with information precalculated by the communications control and management module, into a new receive frame, and provides this at the uplink port.

18. The method according to claim 13, wherein at least two cascaded levels of MDM devices are provided, comprising at least one MDM device in a first level, which MDM device is directly connected to a central control unit, and a plurality of MDM devices in a second or further level, which is arranged between the MDM device of the first level and a plurality of power cells.

19. The method according to claim 18, further comprising a step of providing a central control unit which comprises a multi-core CPU and a plurality of communications interfaces, wherein the power converter has a bridge configuration with a number of branches, and wherein each branch is assigned an individual CPU core of the multi-core CPU, an individual communications interface, an individual MDM device of the first level and a plurality of MDM devices of the second or further level.

20. The method according to claim 19, further comprising a step of providing a number of redundant power cells in each branch of the power converter, said number being greater than the number of power cells necessary for operation of the branch, and/or including a step of providing a redundant control unit, which is connected to all remote I/O devices of a branch of the power converter via a further communications interface of the remote I/O devices, in order to take on the control of the associated power cells as necessary in the event of a fault in the central control unit or a fault in an MDM device, or in a transmission path.

* * * * *